United States Patent Office 3,238,214
Patented Mar. 1, 1966

3,238,214
PRODUCTION OF PYRIDINE FROM TETRA-
HYDROFURFURYL ALCOHOL
Donald G. Manly, Barrington, Joseph P. O'Halloran, Cary, and Fred J. Rice, Jr., Carpentersville, Ill., assignors to The Quaker Oats Company, Chicago, Ill., a corporation of New Jersey
No Drawing. Filed Mar. 23, 1962, Ser. No. 182,120
7 Claims. (Cl. 260—290)

This invention relates to an improved process for producing pyridine from tetrahydrofurfuryl alcohol.

Because of its commercial utility processes for producing pyridine in good yields at low cost are highly desired. Accordingly it is one of the major objects of this invention to provide a process for producing pyridine in high yields.

Another object of this invention is to provide a process for producing pyridine whereby high pressures are not necessary.

A further object of this invention is to provide a process readily adaptable to substantially continuous operation in which by-products of the reaction can be recycled for conversion to the desired end product.

A further object of this invention is to provide a process for producing pyridine that employs relatively inexpensive materials and equipment.

A still further object of the invention is to provide a process for producing pyridine which makes possible the use of the same catalyst over long periods.

In accordance with a preferred embodiment of this invention the foregoing objects are accomplished by contacting tetrahydrofurfuryl alcohol in the vapor phase with hydrogen and ammonia at elevated temperatures. The temperature employed is between about 200 and about 500° C., preferably between about 250 and about 350° C. Hydrogen is supplied to the reaction zone in stoichiometric excess, preferably in such quantity that the molar ratio of hydrogen to the tetrahydrofurfuryl alcohol is in excess of about 7:1 and as high as 105:1 or higher. The ammonia is employed in the present process in quantities such that the volume of ammonia to hydrogen is within the range from about 0.5:9.5 to 2:3 and preferably 1:4. The reactants are passed to the catalytic reaction zone in the vapor phase and reaction is carried out at low pressures which range from atmospheric up to about 4 atmospheres. Preferably the pressure is about 20 p.s.i.g. A preferred feed rate for the tetrahydrofurfuryl alcohol is from about 0.275 to 0.104 parts of alcohol per hour per part of catalyst. However, this can be varied widely.

The catalyst employed in the process of this invention which has been found unique in achieving the desired results and the use of which is therefore critical is palladium supported on alumina. Catalysts comprising palladium supported on alumina are well-known to the art and find widespread use in the petroleum industry among others as catalysts for the hydrogenation and desulfurization of petroleum hydrocarbons. In the interest of brevity and since these palladium-alumina catalysts are well-known to the art, specific details of their preparation are not given herein. Suffice it to say that such catalysts are ordinarily prepared by such methods as impregnation of alumina with palladium or co-precipitation of palladium and aluminum compounds from solution followed by calcination for expulsion of water and volatile acids and so forth. While the palladium-alumina catalysts employed in the present process are of conventional type known to the art, we have found these catalysts to be uniquely effective in producing pyridine from tetrahydrofurfuryl alcohol. With the palladium-alumina catalysts pyridine is produced in high yields from tetrahydrofurfuryl alcohol and the objects of the invention stated heretofore readily achieved. The catalyst can be in the form of pellets or pellet particles as is well known.

The crude reaction product can be easily recovered by mixing it with a solvent such as benzene which forms an azeotrope with water and then distilling the benzene solution to separate overhead the desired pyridine product from other heavier reaction products. Substantially all of the desired pyridine product is found in the overhead distillate fraction boiling up to about 100–140° C.

During the initial stages of operation with a relatively fresh palladium-alumina catalyst the yield of pyridine is greatest. As operation of the process continues with gradual deactivation of the catalyst, the reaction product contains gradually increasing amounts of piperidine. The piperidine so produced is found in the same distillate fraction from the benzene solution distillation as is the pyridine and can be readily separated therefrom by distillation and analyzed by such means as vapor phase chromatography and the like. The piperidine can be recycled to the reaction zone for conversion to the desired pyridine product by dehydrogenation in the presence of the palladium-alumina catalyst or, if desired, can be recovered as a final product.

The invention is further illustrated by the following detailed description in which the quantities of reactants are in parts by weight unless otherwise indicated.

Palladium-alumina pellets having the designation PD-0501-T ⅛ inch obtained from Harshaw Chemical Company and containing about 0.29 percent palladium were charged to an oil-jacketed steel reactor tube included in a hermetically joined system comprising a recycle compressor, flowmeter, preheater, reactor tube, condenser and product tank. Oil is circulated around the reactor tube to maintain a desired temperature therein. The weight of catalyst employed was about 1440 grams. The system was purged with nitrogen to free it of all traces of air. The preheater was adjusted to maintain a temperature of from about 270–320° C. in the catalyst charge. The system was then purged with hydrogen until essentially nitrogen free and then pressurized to about 3.0 p.s.i.g. At this point the hydrogen supply was cut off and the system further pressurized with ammonia to a total pressure of about 5 p.s.i.g. which was maintained substantially constant throughout operation. Tetrahydrofurfuryl alcohol was then introduced to the vaporizer at a variable rate as shown below where it was mixed with a recycle gas comprising a mixture of hydrogen and ammonia. The rate of flow of the recycle gas as well as its molecular weight (determined by the mixture of ammonia and hydrogen) is as shown below. The crude product as obtained from the reactor was azeotroped with benzene to effect separation of the water from the mixture. The remaining benzene solution was then distilled and the overhead fraction boiling at 138° C. was recovered and analyzed by vapor phase chromatography, the chromatographic column having been calibrated for benzene, pyridine and piperidine.

Utilizing the above procedure, a number of consecutive runs were made without regeneration of the catalyst; the operating conditions and results of which are shown in Table I.

TABLE I

| Run | Oil Temp., °C. | Gas Recycle Flow Mw. | Gas Recycle Flow Liters/hr. | NH3 Makeup, mole/hr. | THFA Feed Rate, ml./hr. | Actual Recov., gm./gm. of Feed | H2O, Percent of Theory | Feed Conv., Percent | Residue, Percent of Feed | Pyridine, Percent of Theory | Pyridine and Piperidine, Percent of Theory |
|---|---|---|---|---|---|---|---|---|---|---|---|
| 1 | 300 | 10.5 | 456 | 2.07 | 65 | 105.0 | 100 | 100 | 8.4 | 67.0 | No Piperidine. |
| 2 | 278 | 9.7 | 434 | 2.94 | 70 | 96.2 | 88 | 100 | 5.2 | 54.8 | Do. |
| 3 | 278 | 9.4 | 476 | 2.19 | 68 | 95.6 | 88 | 100 | 4.8 | 51.2 | Do. |
| 4 | 277 | 9.3 | 484 | 2.07 | 66 | 97.3 | 63 | 98 | 3.6 | 57.5 | Do. |
| 5 | 267 | 9.7 | 557 | 2.19 | 68 | 93.1 | 53 | 100 | 4.4 | 50.9 | Do. |
| 6 | 267 | 9.6 | 604 | 2.19 | 70 | 95.2 | 77 | 100 | 9.3 | 51.2 | Do. |
| 7 | 267 | 11.1 | 643 | 2.07 | 68 | 106.4 | 77 | 100 | 7.2 | 58.1 | Do. |
| 8 | 267 | 10.8 | 610 | 2.31 | 68 | 110.3 | 87 | 98 | 5.3 | 51.5 | Do. |
| 9 | 267 | 12.5 | 1,090 | 2.49 | 68 | 101.2 | 80 | 99 | 10.3 | 45.9 | Do. |
| 10 | 297 | 6.8 | 694 | 0.54 | 72 | 82.0 |  | 100 | 11.4 | 55.2 | Do. |
| 11 | 296 | 7.5 | 600 | 1 | 68 | 84.2 | 72 | 100 | 4.7 | 49.3 | Do. |
| 12 | 297 | 9.5 | 535 | 1.53 | 68 | 100.8 | 85 | 100 | 2.7 | 71.0 | Do. |
| 13 | 298 | 8 | 580 | 1 | 68 | 95.5 | 86 | 100 | 1.7 | 67.2 | Do. |
| 14 | 298 | 6.8 | 495 | 0.98 | 68 | 100.5 | 90 | 100 | 3.2 | 69.6 | Do. |
| 15 | 298 | 5.6 | 510 |  | 68 | 96.9 | 87 | 100 | 1.6 | 73.6 | Do. |
| 16 | 297 | 7.6 | 365 | 0.98 | 68 | 110.8 | 97 | 99 | 3.2 | 80.1 | Do. |
| 17 | 297 | 9 | 325 | 1.53 | 68 | 101.2 | 93 | 100 | 1.7 | 75.0 | Do. |
| 18 | 296 | 10 | 841 | 1.74 | 68 | 90.0 | 78 | 100 | 3.1 | 56.3 | Do. |
| 19 | 296 | 10 | 2,060 | 1.53 | 68 | 92.2 | 80 | 99 | 4.7 | 46.0 | 54.0. |
| 20 | 322 | 7.5 | 311 |  | 68 | 98.1 | 93 | 100 | 4.5 | 68.2 |  |
| 21 | 321 | 9 | 265 | 2.07 | 68 | 105.0 | 96 | 100 | 4.2 | 68.2 | 71.6. |
| 22 | 321 | 7 | 280 | 1 | 68 | 105.1 | 96 | 100 | 6.8 | 61.3 | 68.7. |
| 23 | 300 | 6.3 | 177 | 0.98 | 68 | 97.3 | 89 | 100 | 6.0 | 56.2 | 59.2. |
| 24 | 300 | 7.8 | 200 |  | 68 | 101.4 | 89 | 100 | 5.0 | 61.2 | 69.6. |
| 25 | 300 | 7.0 | 240 |  | 68 | 106.4 | 97 | 100 | 5.4 | 59.1 | 70.3. |
| 26 | 327 | 7 | 250 |  | 68 | 112.0 | 100 | 100 | 8.5 | 65.1 | 71.8. |
| 27 | 327 | 10 | 320 |  | 68 | 112.2 | 97 | 100 | 10.6 | 40.0 | 51.2. |
| 28 | 299 | 14 |  |  | 68 | 102.5 | 71 | 98 | 17.4 | 10.5 | 18.5. |
| 29 | 300 | 14 |  | 2.9 | 68 | 103.8 | 65 | 99 | 11.9 | 16.0 | 28.9. |

As seen from the above results, the maximum yield of pyridine (80% theory) was obtained in Run #16, following which the amount of piperidine in the reaction product gradually increased with consequent reduction in pyridine yield. Considering the palladium-alumina catalyst as deactivated when the total yield of pyridine and piperidine falls below 50% of theory the process would be discontinued at runs number 28 and 29 and the catalyst regenerated. At this stage, the catalyst had been in use for approximately 385 hours.

Regeneration of the catalyst can be effectively accomplished by heating to temperatures of about 600–650° C., in the presence of air or other oxygen containing gas. The catalyst can be regenerated in situ in the reaction zone of placed in any suitable heating apparatus such as a muffle furnace and the like.

Utlizing the same general procedure as above, a number of runs were made at preferred operating conditions utilizing a palladium-alumina catalyst which had been regenerated by heating in a muffle furnace at 650° C. for approximately 13 hours. The pressure employed was about 20 p.s.i.g. The operating conditions and results obtained are tabulated below.

TABLE II

| Run | Oil Temp., °C. | Recycle Flow Mw. | Recycle Flow Liter/hr. | NH3 Makeup, mole/hr. | Feed Rate, ml./hr. | Recov., percent actual | H2O, percent of theory | Conv., percent | Residue, percent of Feed | Pyridine, percent of Theory | Pyridine and Piperidine, percent of Theory | Ratio, Piperidine/Pyridine |
|---|---|---|---|---|---|---|---|---|---|---|---|---|
| 30 | 303 | 8.3 | 730 | 0.4 | 74 | 46 | 96 | 100 |  | 61.6 | 62.8 | 0.02 |
| 31 | 301 | 7.3 | 620 | 1.9 | 71 | 106 | 96.4 | 100 | 6.8 | 66.5 | 70.2 | 0.06 |
| 32 | 303 | 8.7 | 670 | 2.0 | 73 | 113 | 101.1 | 100 | 7.5 | 65.2 | 71.2 | 0.09 |
| 33 | 302 | 8.7 | 670 | 2.7 | 70 | 113 | 100.0 | 100 | 8.3 | 52.9 | 57.0 | 0.20 |
| 34 | 302 | 8.7 | 670 | 3.4 | 72 | 117 | 101.1 | 100 | 9.7 | 46.6 | 61.0 | 0.31 |
| 35 | 301 | 9.9 | 630 | 3.2 | 71 | 113 | 93.1 | 100 | 9.2 | 49.9 | 67.6 | 0.36 |
| 36 | 301 | 9.0 | 620 | 2.5 | 71 | 107 | 93.4 | 100 | 8.4 | 49.6 | 66.8 | 0.35 |
| 37 | 302 | 8.4 | 550 | 2.0 | 71 | 108 | 92.4 | 100 | 8.0 | 46.5 | 71.4 | 0.54 |
| 38 | 301 | 7.7 | 530 | 1.6 | 73 | 114 | 99.1 | 100 | 8.8 | 45.2 | 68.5 | 0.51 |
| 39 | 301 | 7.5 | 490 | 1.5 | 71 | 110 | 93.9 | 100 | 8.3 | 36.9 | 67.3 | 0.82 |
| 40 | 301 | 7.7 | 490 | 1.2 | 71 | 113 | 98.6 | 100 | 8.3 | 33.7 | 64.0 | 0.90 |
| 41 | 301 | 7.3 | 490 | 1.2 | 70 | 108 | 91.6 | 99 | 8.6 | 37.6 | 68.3 | 0.81 |
| 42 | 301 | 7.0 | 550 | 1.3 | 71 | 112 | 98.0 | 100 | 8.7 | 39.1 | 70.0 | 0.79 |
| 43 | 302 | 7.3 | 520 | 1.4 | 71 | 110 | 94.4 | 100 | 8.5 | 27.5 | 62.9 | 1.29 |
| 44 | 301 | 7.5 | 560 | 1.0 | 71 | 111 | 93.0 | 100 | 8.7 | 34.9 | 68.2 | 0.97 |
| 45 | 301 | 6.7 | 590 | 1.4 | 71 | 112 | 102.0 | 100 | 9.0 | 33.9 | 68.9 | 1.03 |
| 46 | 301 | 7.0 | 580 | 1.3 | 72 | 111 | 94.1 | 100 | 8.8 | 22.2 | 63.9 | 1.87 |
| 47 | 301 |  | 580 | 1.0 | 70 | 109 | 97.8 | 100 | 9.1 | 40.2 | 64.3 | 0.60 |
| 48 | 301 | 7.9 | 610 | 1.2 | 73 | 112 | 95.6 | 100 | 7.3 | 26.9 | 62.2 | 1.31 |
| 49 | 301 | 6.5 | 520 | 0.9 | 70 | 107 | 99.5 | 99 | 8.9 | 30.7 | 71.5 | 1.32 |
| 50 | 301 | 7.5 | 560 | 1.1 | 70 | 116 | 98.7 | 100 | 9.2 | 27.9 | 64.6 | 1.32 |
| 51 | 301 |  | 540 | 1.1 | 69 | 113 | 98.6 | 99 | 9.5 | 26.4 | 65.8 | 1.52 |
| 52 | 301 | 8.3 | 580 | 1.2 | 73 | 111 | 93.4 | 100 | 9.1 | 28.9 | 71.9 | 1.48 |
| 53 | 301 | 7.5 | 580 | 1.0 | 69 | 114 | 97.2 | 100 | 9.7 | 25.3 | 67.3 | 1.66 |
| 54 | 301 | 8.4 | 620 | 1.7 | 71 | 113 | 95.5 | 100 | 9.3 | 16.0 | 62.8 | 2.93 |
| 55 | 301 | 8.9 | 620 | 1.1 | 68 | 116 | 95.9 | 100 | 9.9 | 25.4 | 71.5 | 1.81 |
| 56 | 301 | 9.3 | 610 | 1.4 | 66 | 114 | 97.6 | 100 | 9.7 | 20.8 | 68.2 | 2.28 |
| 57 | 301 | 9.1 | 620 | 1.4 | 69 | 113 | 95.7 | 100 | 9.2 | 23.2 | 65.4 | 1.82 |
| 58 | 301 | 10.1 | 610 | 1.7 | 72 | 117 | 96.8 | 99 | 9.6 |  |  |  |

The advantages of the present invention are apparent from the foregoing description and exeprimental data. As is seen by means o fthe process of the invention pyridine is produced in good yields at low pressures from tetrahydrofurfuryl alcohol. As is obvious, it is possible also to recover any piperidine which is formed in the process. The advantages of the present invention are particularly unique with the use of the palladium-alumina catalyst.

Those modifications and equivalents which fall within the spirit of the invention and the scope of the appended claims are to be considered part of the invention.

We claim:
1. A process for producing pyridine which comprises contacting tetrahydrofurfuryl alcohol in vapor phase with hydrogen and ammonia at a temperature between about

200 and 500° C. in the presence of a metallic palladium supported on alumnia catalyst and at a pressure of less than about 4 atmospheres and employing a molar ratio of hydrogen to tetrahydrofurfuryl alcohol in excess of about 7:1 and a ratio of hydrogen to ammonia at least about 1.5:1 by volume.

2. The process of claim 1 wherein the contacting is effected at a pressure of about 20 pounds per square inch guage.

3. A process for producing pyridine which comprises contacting tetrahydrofurfuryl alcohol in vapor phase with hydrogen and ammonia at a temperature between about 200 and 500° C. in the presence of a metallic palladium supported on alumina catalyst and at a pressure of less than about 4 atmospheres, the molar ratio of hydrogen to tetrahydrofurfuryl alcohol being in excess of about 7:1 and the ratio of hydrogen to ammonia at least about 1.5:1 by volume, mixing the product resulting from the reaction with benzene to form an azeotrope with water which may be present, then distilling the resulting benzene solution, collecting the distillate fraction boiling up to about 140° C. and separating the pyridine in said distillate fraction.

4. The process of claim 3 wherein piperidine is separated from the pyridine in said distillate fraction and recycled to said reaction zone.

5. The process of claim 3 wherein piperidine in said distillate fraction is recovered as product.

6. A continuous process for producing pyridine which comprises introducing tetrahydrofurfuryl alcohol in vapor phase into a reaction zone maintained at a temperature between about 200 and 500° C. and having present therein a metallic palladium supported on alumina catalyst, introducing hydrogen and ammonia into said reaction zone in such manner that the pressure therein does not exceed about 4 atmospheres, recovering the product from said reaction zone, discontinuing introduction of reactants to said reaction zone when the yield of products falls below a predetermined value, regenerating said catalyst by heating it to a temperature of from about 600 to about 650° C. in the presence of oxygen, and then continuing the introduction of said reactants into the reaction zone having present therein the regenerated metallic palladium supported on alumina catalyst.

7. The process of claim 6 wherein the molar ratio of hydrogen to tetrahydrofurfuryl alcohol is in excess of about 7:1 and the ratio of hydrogen to ammonia at least about 1.5:1 by volume.

References Cited by the Examiner

UNITED STATES PATENTS

| 2,543,424 | 2/1951 | Spillane et al. | 260—290 |
| 2,963,484 | 12/1960 | Denton | 260—290 |
| 2,972,615 | 2/1961 | Denton | 260—290 |
| 2,972,616 | 2/1961 | Denton | 260—290 |
| 2,979,510 | 2/1961 | Denton | 260—290 |

OTHER REFERENCES

Kluie et al., J. Am. Chem. Soc., vol. 66, pp. 1710–3 (1944).

Natta et al., Chem. Abstracts, vol. 37, p. 6261 (1943).

WALTER A. MODANCE, *Primary Examiner.*

DUVAL T. McCUTCHEN, NICHOLAS S. RIZZO, JOHN D. RANDOLPH, *Examiners.*